US010440526B1

(12) United States Patent
Lim et al.

(10) Patent No.: US 10,440,526 B1
(45) Date of Patent: Oct. 8, 2019

(54) METHOD FOR REAL-TIME TALK-GROUP CREATION WITHIN A PUSH TO TALK FOR THE INTERNET OF THINGS SYSTEM

(71) Applicant: MOTOROLA SOLUTIONS, INC, Chicago, IL (US)

(72) Inventors: Bing Qin Lim, Jelutong (MY); Soon Hoe Lim, Ipoh (MY); Ming Yeh Koh, Bdr Baru Air Itam (MY); Syed Isa Syed Idrus, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/186,628

(22) Filed: Nov. 12, 2018

(51) Int. Cl.
*H04W 4/08* (2009.01)
*H04L 29/08* (2006.01)
*H04W 4/10* (2009.01)

(52) U.S. Cl.
CPC .............. *H04W 4/08* (2013.01); *H04L 67/12* (2013.01); *H04W 4/10* (2013.01)

(58) Field of Classification Search
CPC .......... H04W 4/08; H04W 4/10; H04L 67/12; H04L 29/06442
USPC ........................................................ 455/519
See application file for complete search history.

(56) References Cited

U.S. PATENT DOCUMENTS

| 7,508,840 | B2 | 3/2009 | Delaney | |
| 10,129,711 | B1* | 11/2018 | Saadoun | H04L 65/4061 |
| 10,136,295 | B1* | 11/2018 | Chee | H04W 4/90 |
| 10,230,414 | B1* | 3/2019 | Lee | H04B 1/3833 |
| 10,274,320 | B2* | 4/2019 | Chin | G01C 21/005 |
| 10,299,101 | B1* | 5/2019 | Lim | H04W 4/90 |
| 10,341,824 | B1* | 7/2019 | Tov | H04W 4/10 |
| 2002/0097746 | A1* | 7/2002 | McDonald | H04L 12/1827 370/468 |
| 2010/0159976 | A1 | 6/2010 | Marocchi et al. | |
| 2014/0047487 | A1 | 2/2014 | Guedalia et al. | |
| 2014/0243034 | A1* | 8/2014 | Gurney | H04W 4/70 455/519 |
| 2014/0324973 | A1* | 10/2014 | Goel | H04W 4/70 709/204 |
| 2017/0223807 | A1 | 8/2017 | Recker et al. | |
| 2017/0345420 | A1 | 11/2017 | Barnett, Jr. | |
| 2019/0041216 | A1* | 2/2019 | Chin | G01C 21/005 |
| 2019/0069123 | A1* | 2/2019 | Vincent | H04W 4/70 |
| 2019/0121497 | A1* | 4/2019 | Tov | H04L 41/22 |

* cited by examiner

*Primary Examiner* — Hai V Nguyen (57) ABSTRACT

A method and apparatus for PTT over IoT is described herein. During operation each IoT device will be assigned to a talkgroup. Some talkgroups may have a single IoT device assigned, some IoT device may have multiple talkgroups assigned, and other talkgroups may have multiple IoT devices assigned. During operation, an action command is received over a first talkgroup and a first command type is issued to a first IoT device assigned to that talkgroup. A second action command is received over a second talkgroup and a second command type is issued to a second IoT device assigned to the second talkgroup. When determine that multiple radios are issuing action command to the same IoT device through PTT talkgroup, create a new PTT talkgroup to be populated with the multiple radios.

15 Claims, 7 Drawing Sheets

METHOD FOR REAL-TIME TALK-GROUP CREATION WITHIN A PUSH TO TALK FOR THE INTERNET OF THINGS SYSTEM

BACKGROUND OF THE INVENTION

The Internet of Things (IoT) refers to the connection of every-day devices to the Internet. Devices such as cars, kitchen appliances, medical devices, doors, windows, HVAC systems, drones, . . . , etc. can all be connected through the IoT. Basically, anything that can be powered can be connected to the internet to control its functionality. The IoT allows objects to be sensed or controlled remotely across existing network infrastructure, creating opportunities for more direct integration of the physical world into computer-based systems, and resulting in improved efficiency, accuracy, and control.

Push-to-talk (PTT) devices are commonly employed by public safety personnel, air traffic controllers, emergency workers, construction site workers and others who need to be in constant and readily available voice communication. PTT, also known as press-to-transmit, is a method of communicating using half-duplex communication lines. A PTT button may be pressed to switch a device from a voice reception mode to a transmit-mode. For example, one operator may depress the PTT button on her device and speak into the device's microphone. The speech is converted into an appropriate format and transmitted to one or more other devices, where the operators of those other devices hear the first operator speak through their device's speaker.

In a two-way radio system, each PTT radio typically communicates with one group of radios (talkgroup) at a time. Even though a radio may switch between talkgroups, the radio may still only be able to communicate with a single talkgroup at a time. For example, a firefighter may be affiliated with or using a firefighter talkgroup and a police officer may be affiliated with or using a police talkgroup. Talkgroups outside of those currently listened to by a radio will not be heard by other radios or consoles. Thus, a radio speaker will only output audio from a talkgroup associated with the radio, and the radio's transmission will only be heard by those communicating on a same talkgroup.

Instead of assigning, for example, a radio channel to one particular organization (group) at a time, users are instead assigned to a logical grouping, a "talkgroup". When any user in that group wishes to converse with another user in the talkgroup, a vacant radio channel is found automatically by the system and the conversation takes place on that channel. Many unrelated conversations can occur on a channel, making use of the otherwise idle time between conversations. A control channel coordinates all the activity of the radios in the system. The control channel sends packets of data to enable one talkgroup to talk together, regardless of frequency.

Because PTT and talkgroups are so ubiquitous in the public-safety realm, it would be beneficial if PTT and talkgroups could be used to control devices for the IoT, therefore a need exists PTT for the IoT.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for PTT over IoT is described herein. During operation each IoT device will be assigned to a talkgroup. Some talkgroups may have a single IoT device assigned, and other talkgroups may have multiple IoT devices assigned. During operation, an action command is received over a first talkgroup and a first command type is issued to a first IoT device assigned to that talkgroup. A second action command is received over a second talkgroup and a second command type is issued to a second IoT device assigned to the second talkgroup.

It should be noted that the "action command" may simply be any transmission received over a particular talkgroup, even a simple keying of a microphone, with no other voice or data transmission (i.e., the received "action command" comprises an un-modulated carrier signal with no data or voice). In other words, sinusoidal signal that is used in the modulation is known as the carrier signal, or simply "the carrier". The signal that is used in modulating the carrier signal (or sinusoidal signal) is known as the "data signal" or the "message signal". It is important to notice that a simple sinusoidal carrier contains no information of its own, and may be used to control IoT devices as described.

However, in alternate embodiments, an "action command" may comprise information modulated on the carrier signal, for example, the utterance of specific words, for example, "unlock the door", "turn on the lights", . . . , etc. So for example, in a first embodiment, a radio tuned to a "door" talkgroup may unlock the door by simply tuning their radio to the "door talkgroup" and keying their microphone by pushing the PTT button on their radio. In a second embodiment, a radio tuned to a "door" talkgroup may unlock the door by simply tuning their radio to the "door talkgroup" and keying their microphone by pushing the PTT button on their radio, and uttering "unlock" into their radio.

As an example, consider a public-safety officer that is approaching a room with a locked door. The public-safety officer can initiate a PTT call to the talkgroup that includes all actuators for the door, and the door of the room can be opened. If a light for the room is in the same talkgroup, then the light can be switched on with the same PTT call.

Figure 1:
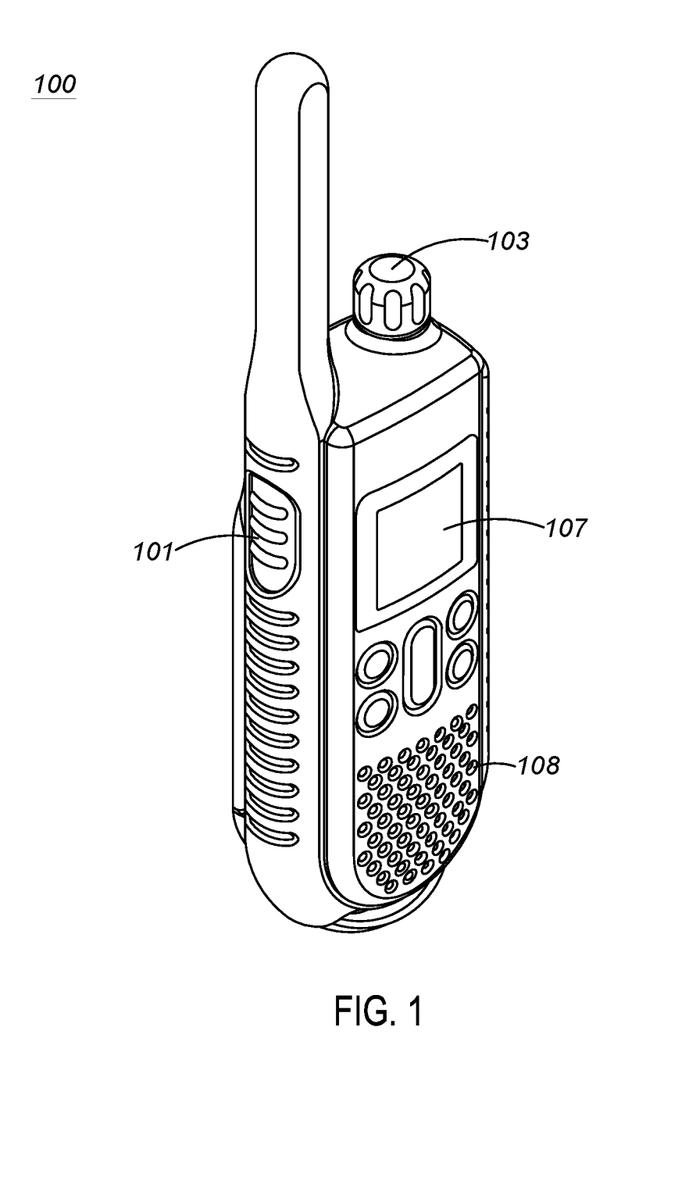
FIG. 1 illustrates push-to-talk (PTT) radio.

FIG. 1 illustrates push-to-talk (PTT) radio 100. As shown, radio 100 comprises PTT button 101, knob 103, display/screen 107, and speaker/microphone 108. PTT button 101 comprises a standard button, that when pressed, transitions radio 100 from a listening state, to a transmit state, transmitting over a specific talkgroup. Display 107 comprises a way of conveying (e.g., displaying) PTT information to the user. In particular, in an embodiment, a talkgroup may be displayed to the user as an alpha-numeric output on display 107. Display 107 may simply comprise a liquid-crystal display (LCD), or may comprise additional types of displays (e.g., a light-emitting diode (LED) display). Display 107 may also comprise a touch-screen display that provides both an output interface and an input interface between the device and a user. Display 107 may also provide graphics, video, and any combination thereof.

Speaker/microphone combination 108 comprises a standard speaker for outputting audio and a standard microphone for receiving audio (voice). More particularly, speaker 108 converts an electrical signal generated from an active application to human-audible sound waves and microphone 108 converts sound waves to electrical signals for transmission.

Knob 103 serves as a way to control the volume of speaker 108, and also serves as a means for switching between talkgroups. Knob 103 is approximately a cylindrical object. Knob 103 can alternatively be implemented as a variety of different objects, including conical shapes, spherical shapes, dials, cubical shapes, rods, etc., and may have a variety of different textures on their surfaces, including bumps, lines, or other grips, or projections or members extending from the circumferential surface.

The user 201 (shown in FIG. 2) preferably grips or contacts the circumferential surface of knob 103 and rotates it a desired amount to scroll through menu items, for example, talkgroups that may be selected. Once knob 103 is rotated to highlight a particular talkgroup, any activation (pushing) of the PTT button 101 will cause radio 100 to communicate over the highlighted talkgroup.

Figure 2:
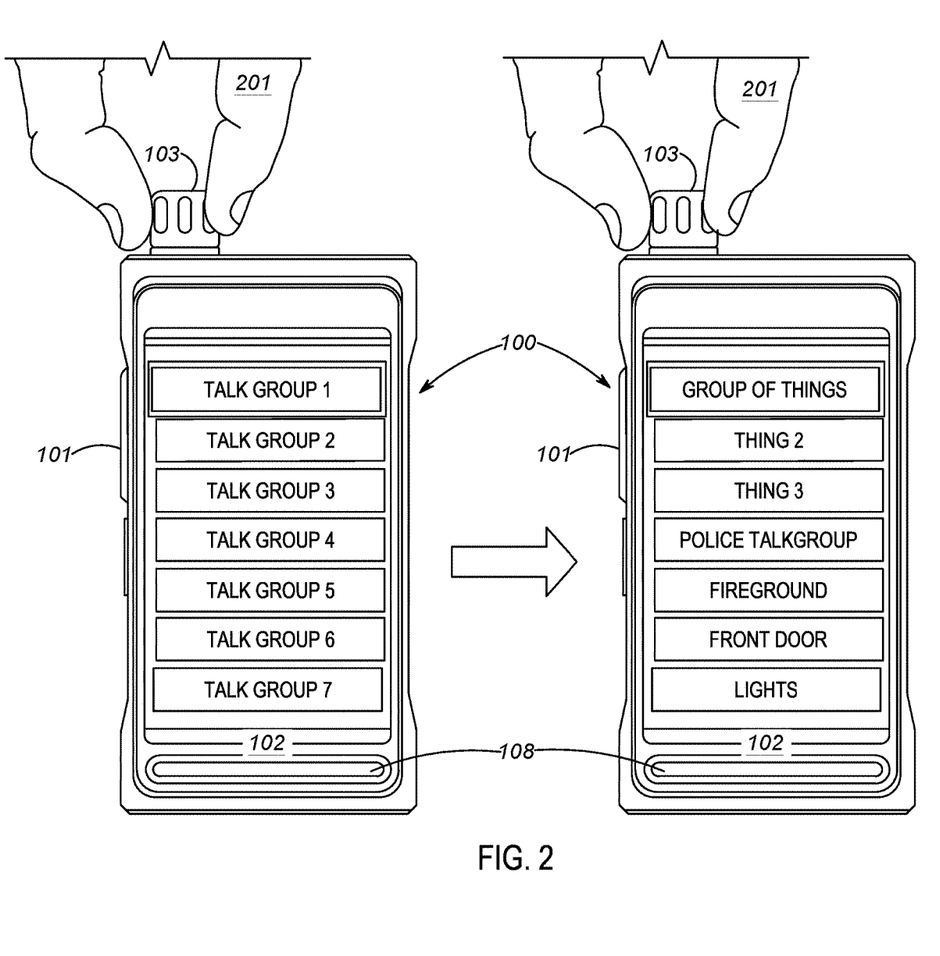
FIG. 2 illustrates push-to-talk (PTT) radio.

It should be noted that display 102 may display the names of the talkgroups, which include the names of IoT devices that are controlled by pushing the PTT button. For example, as shown in FIG. 2, the Police Talkgroup and the Fire ground talkgroup may be displayed, so when highlighted, communications to other police officers, or firemen take place upon the pushing of the PTT button 101. However, as shown, IoT devices may also be displayed, such as Front Door, Lights, Group of Things, Thing 2, Thing 3, . . . , etc. When an IoT device is highlighted, activation of the PTT button will cause the IoT device (or the group of devices) to function.

In order to accomplish the above, a PTT-to-Things Server is provided that is a member of IoT talkgroups. Communication to the PTT-to-Things server over a particular talkgroup causes the PTT-to-Things server to map the talkgroup to a particular IoT device (or group of IoT devices), and potentially to a particular protocol to control an IoT device. The PTT-to-Things server then instructs the particular IoT device to perform an action.

As is known in the art, modern two-way radio systems comprise talkgroups, where it is possible for a radio to be a member of any combination of talkgroups. As a member of a talkgroup, a radio may receive transmissions from, as well as transmit to all members of the talkgroup. Transmission and reception of information to radios outside of an assigned talkgroup is generally not performed. Illustratively, a radio assigned to an ambulance may be a member of a Fire & Rescue talkgroup as well as a Law Enforcement talkgroup. Therefore, the radio may communicate with all members of the Fire & Rescue talkgroup as well as the Law Enforcement talkgroup. In the present invention, server 301 is provided that is a member of talkgroups that are assigned to a "thing" connected to the IoT. This is illustrated in FIG. 3.

Figure 3:
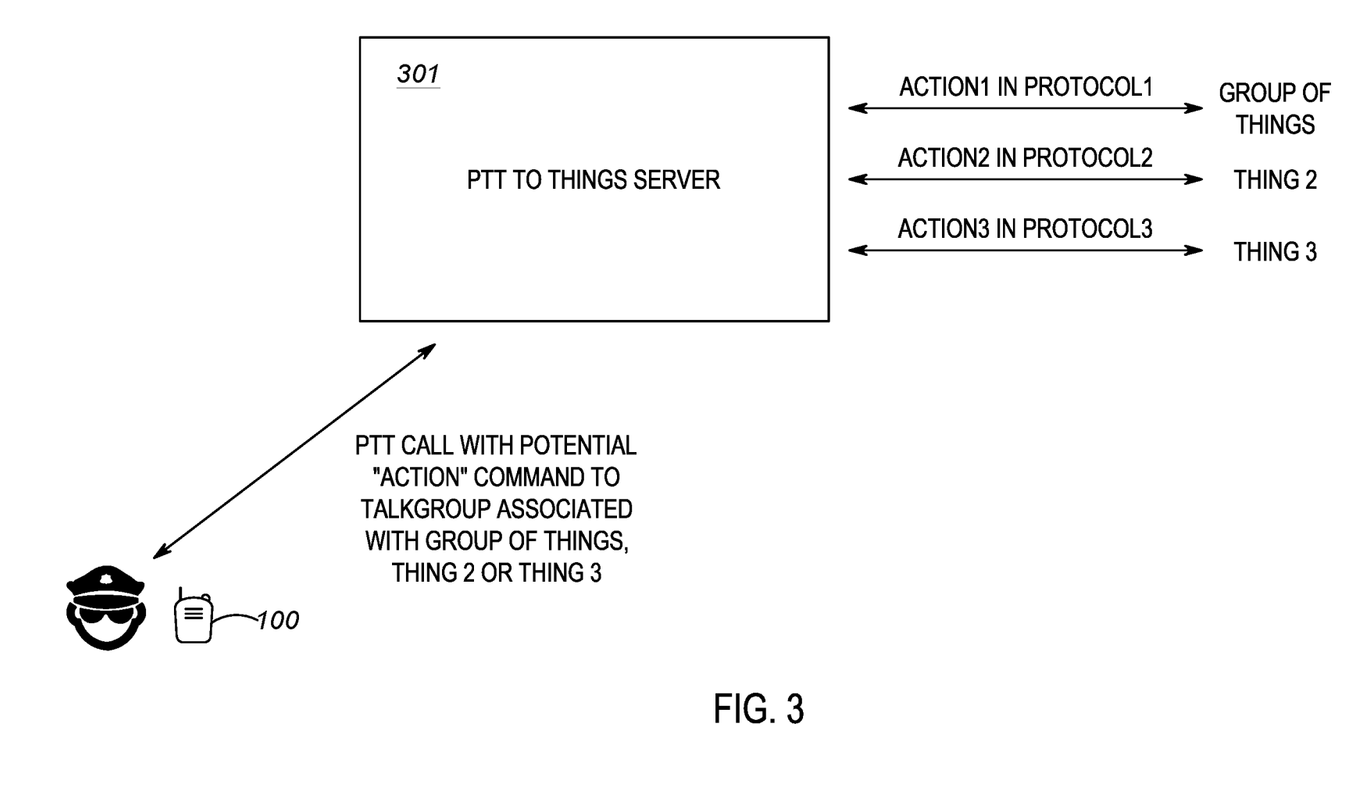
FIG. 3 illustrates a PTT to IoT server.

As shown in FIG. 3, PTT-to-Things server 301 is shown in communication with radio 100. PTT-to-Things server 301 is a member of a plurality of talkgroups. When PTT-to-Things server 301 receives a PTT call over a particular talkgroup to which it is a member, PTT-to-Things server 301 will map the particular talkgroup to an IoT device, and potentially a particular IoT protocol. PTT-to-Things server 301 will then communicate with the IoT device to cause the IoT device to perform a particular action.

As is known in the art, a particular communication protocol (IoT protocol) may be used for each IoT device. For example, various proprietary protocols such as DNP, Various IEC**** protocols (IEC 61850 etc. . . . ), bacnet, EtherCat, CANOpen, Modbus/Modbus TCP, EtherNet/IP, PROFIBUS, PROFINET, DeviceNet, . . . , etc. can be used. Also a more generic protocol such as Coap, Mqtt, and RESTfull may also be used.

As mentioned above, an action command may be received by PTT-to-Things server 301 as part of the PTT call over the particular talkgroup. PTT-to-Things server 301 may analyze the action command (which in a preferred embodiment comprises a voice command) and additionally map the action command to an instruction given to the IoT device.

In a further embodiment, a first instruction may be provided to the IoT device upon detecting transmission upon the particular talkgroup, and a second instruction may be provided to the IoT device upon detecting that no further transmission is being received on the talkgroup. (It should be noted that "transmission" comprises simply opening up the channel (transmitting the carrier signal) by pushing the PTT button, no voice needs to be detected). As an example, a user may switch their radio to a talkgroup associated with lighting in a room. Pushing and holding the PTT button may cause the lights to go on, while un-pressing the PTT button may cause the lights to go off. This entails PTT-to-Things server 301 to send an instruction to the lights to turn on upon detecting any transmissions on a particular talkgroup (even the carrier), and then instructing the lights to go off upon detecting that transmissions on a particular talkgroup has ceased.

Figure 4:
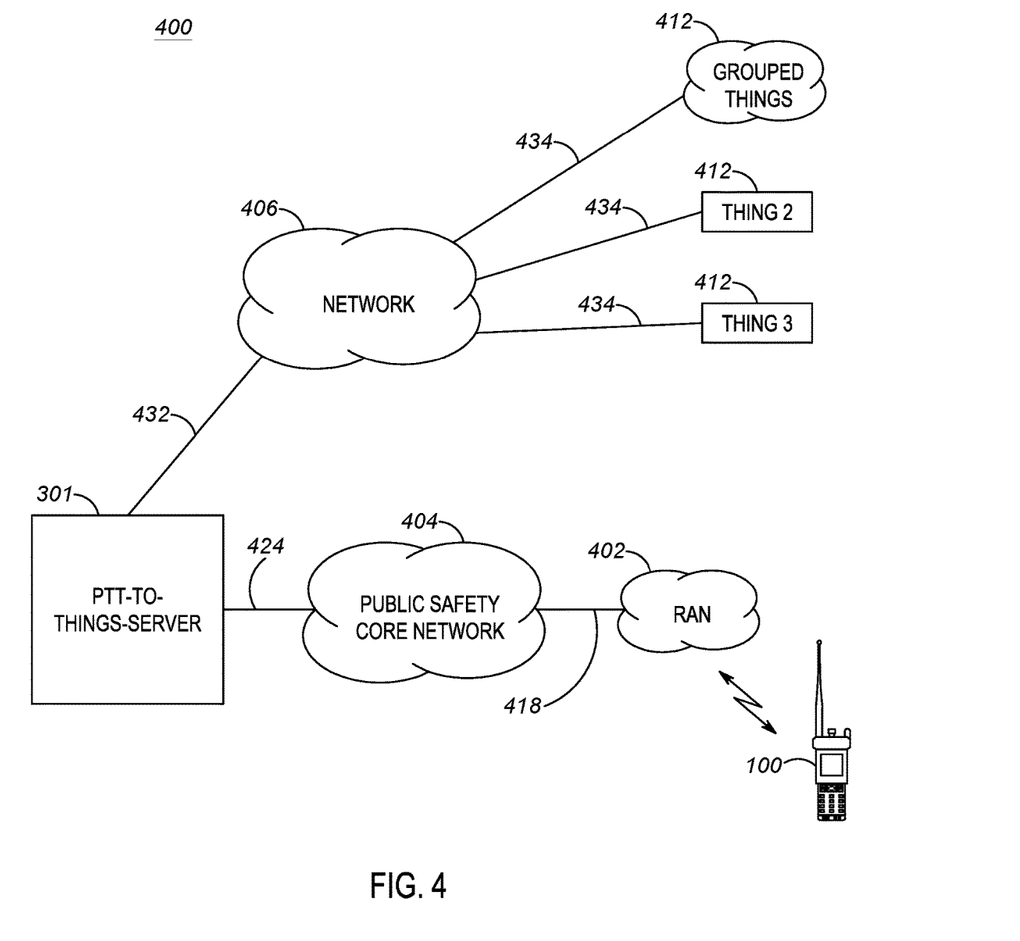
FIG. 4 depicts an example communication system that incorporates a PTT-to-Things server.

FIG. 4 depicts an example communication system 400 that incorporates PTT-to-Things server 301. It should be noted that the communication system depicted in FIG. 4 comprises a typical public-safety communication system modified with a PTT-to-Things server. However one of ordinary skill in the art would recognize that other system may be modified to encompass PTT-to-Things server 301 such as, but not limited to a cellular communication system, a cloud-based communication system, . . . , etc. System 400 includes one or more radio access networks (RANs) 402, a public-safety core network 404, PTT radio 100, IoT devices 412, PTT-to-Things server 301, and communication links 418, 424, and 432.

RAN 402 includes typical RAN elements such as base stations, base station controllers (BSCs), routers, switches, and the like, arranged, connected, and programmed to provide wireless service to user equipment (e.g., radio 100, and the like) in a manner known to those of skill in the relevant art. RAN 402 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RAN 402 may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, RAN 402 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Public-safety core network 404 may include one or more packet-switched networks and/or one or more circuit-switched networks, and in general provides one or more public-safety agencies with any necessary computing and communication needs, transmitting any necessary public-safety-related data and communications.

For narrowband LMR wireless systems, core network 404 operates in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Group calls may be made between wireless and/or wireline participants in accordance with either a narrowband or a broadband protocol or standard. Group members for group calls may be statically or dynamically defined. That is, in a first example, a user or administrator may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group. In another example, communication devices may dynamically affiliate with a group (and also disassociate with the group) perhaps based on user input, and the switching and/or radio network may track group membership and route new group calls according to the current group membership.

Radio 100 may be any suitable computing and communication device configured to engage in wireless communication with the RAN 402, and ultimately to PTT-to-Things server 301 over the air interface as is known to those in the relevant art. It should also be noted that any one or more of the communication links 418, 424, 432, and 434 could include one or more wireless-communication links and/or one or more wired-communication links.

Expanding on the above, each user of the system may possess a radio to communicate over many differing talkgroups. Communication on various talkgroups will be routed by RAN 402 and network 404 to PTT-to-Things server 301. When PTT-to-Things server 301 receives a communication over a particular talkgroup from any radio 100, PTT-to-Things server 301 will map the particular talkgroup to an IoT device 412. Communication to a particular IoT device 412 (or group of devices if multiple IoT devices 412 are associated with the same talkgroup) will take place via communication links 432/434 and intervening network 406.

Network 406 preferably comprises one of many networks used to transmit data, such as but not limited to a network employing one of the following protocols: a Long Term Evolution (LTE) protocol, LTE-Advance protocol, or 5G protocol including multimedia broadcast multicast services (MBMS) or single site point-to-multipoint (SC-PTM) protocol over which an open mobile alliance (OMA) push to talk (PTT) over cellular protocol (OMA-PoC), a voice over IP (VoIP) protocol, an LTE Direct or LTE Device to Device protocol, or a PTT over IP (PoIP) protocol, a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

With the above in mind, PTT-to-Things server 301 may also be configured with a natural language processing (NLP) engine (not shown in FIG. 4) configured to determine an "action command" from any over-the-air voice transmissions received by radio 100. The NLP engine may also analyze oral queries and/or statements received by any user and provide responses to the oral queries and/or take other actions in response to the oral statements. It should be noted that any over-the-air communication between users (e.g., on the talkgroup) will be monitored by the NLP engine in order to determine the content of the over-the-air voice transmission.

Figure 5:
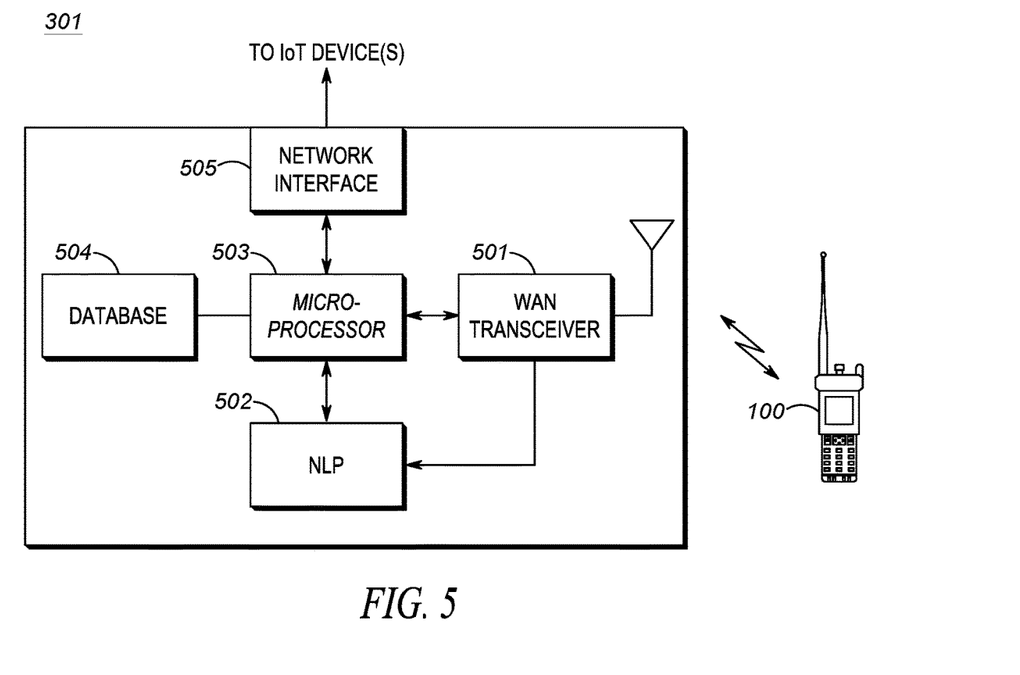
FIG. 5 is a block diagram of a PTT to IoT server.

FIG. 5 is a block diagram PTT to IoT server 301. In an embodiment, PTT to IoT server 301 is embodied within a dispatch center, however in alternate embodiments the device may be embodied within the public-safety core network 404, or more computing devices in a cloud compute cluster (not shown), or some other communication device not illustrated in FIG. 4, and/or may be a distributed communication device across two or more entities.

FIG. 5 shows those components (not all necessary) for PTT to IoT server 301 to receive a communication from a radio using a particular talkgroup, map the particular talkgroup to an IoT device(s), and send an appropriate command to the IoT device. For ease of illustration some components have been left out of FIG. 4. For example, a graphical user interface that provides the dispatch operator necessary information about public-safety officers is not shown since that component is not necessary for understanding the following discussion.

As shown, PTT to IoT server 301 may include a wide-area-network (WAN) transceiver 501 (e.g., a transceiver that utilizes a public-safety communication-system protocol), Natural Language Processor (NLP) 502, logic circuitry 503, database 504, and network interface 505. In other implementations, PTT to IoT server 301 may include more, fewer, or different components. Regardless, all components are connected via common data busses as known in the art.

WAN transceiver 501 may comprise well known long-range transceivers that utilize any number of network system protocols. (As one of ordinary skill in the art will recognize, a transceiver comprises both a transmitter and a receiver for transmitting and receiving data). For example, WAN transceiver 501 may be configured to utilize a next-generation cellular communications protocol operated by a cellular service provider, or any public-safety protocol such as an APCO 25 network or the FirstNet broadband network. WAN transceiver 501 receives communications from users over a particular talkgroup. It should be noted that WAN transceiver 501 is shown as part of PTT to IoT server 301, however, WAN transceiver 501 may be located in RAN 402 (e.g., a base station of RAN 202), with a direct link to PTT to IoT server 301.

NLP 502 may be a well known circuitry to analyze, understand, and derive meaning from human language in a smart and useful way. By utilizing NLP, automatic summarization, translation, named entity recognition, relationship extraction, sentiment analysis, speech recognition, and topic segmentation can take place.

Logic circuitry 503 comprises a digital signal processor (DSP), general purpose microprocessor, a programmable logic device, or application specific integrated circuit (ASIC) and is configured to map a talkgroup to an IoT device(s), and alternatively also map a talkgroup and potentially a received utterance to a command given to an IoT device. For example, consider a public-safety officer that is approaching a room with a locked door. The public-safety officer can initiate a PTT call using a particular talkgroup. WAN transceiver may detect the transmission and provide the transmission to logic circuitry 503. Logic circuitry 503 can (via mapping) determine that the talkgroup is associated with the locked door. Logic circuitry 503 then can instruct all actuators for the door to be opened.

The mapping process preferably comprises an operation that associates each element of a given set (the domain) with one or more elements of a second set (the range). The talkgroup and potentially an action command comprises the domain, while the IoT device and command the range. The mapping is preferably explicit based on predefined rules (e.g., talkgroup 423 is assigned to door lock 1).

Database 504 is provided. Database 504 comprises standard memory (such as RAM, ROM, . . . , etc) and serves to store talkgroup/IoT device pairs. Database 504 may also comprise a list of authorized users for each IoT device, and may additionally store talkgroup/IoT device pairs along with action command/action taken pairs. This is illustrated in Tables 1 and 2 below:

TABLE 1

Mapping of talkgroup to device and instruction when no verbal action command is used

| Talkgroup | Device | Instruction (control command) | Address of IoT device |
|---|---|---|---|
| 4320 | Lock at the Police Station | Switch from lock to unlock, or vice versa | 10.66.123 |
| 4356 | Light at the Police Station | Switch light from off to on or vice versa | 10.66.124 |
| 6748 | Air conditioning at the Police Station | Turn air conditioning from off to on or vice versa | 10.66.125 |
| . . . | . . . | . . . | . . . |

TABLE 2

Mapping of talkgroup to device and instruction when action command is used

| Talk group | Device | Verbal Action Command | Instruction (control command) | Address of IoT device |
|---|---|---|---|---|
| 4320 | Lock at the Police Station | unlock | Switch from lock to unlock | 10.66.124 |
| 4320 | Lock at the Police Station | lock | Switch from unlock to lock | 10.66.124 |
| 4356 | Light at the Police Station | off | Turn light off | 10.66.125 |
| 4356 | Light at the Police Station | on | Turn light on | 10.66.125 |
| . . . | . . . | . . . | . . . | . . . |

Finally, network interface 505 provides processing, modulating, and transceiver elements that are operable in accordance with any one or more standard or proprietary wireless interfaces, wherein some of the functionality of the processing, modulating, and transceiver elements may be performed by means of the logic circuitry 503 through programmed logic such as software. Examples of network interfaces (wired or wireless) include Ethernet, T1, USB interfaces, IEEE 802.11b, IEEE 802.11g, etc.

With the above in mind, FIG. 5 illustrates an apparatus comprising logic circuitry receiving a talkgroup identification and mapping the talkgroup identification to an Internet-of-Things (IoT) device, the logic circuitry also determining a control command based on the IoT device. A network interface is provided that is coupled to the logic circuitry, the network interface outputs the control command to operate the IoT device.

As discussed the logic circuitry may also receive a verbal action command and determines the control command based on both the IoT device and the verbal action command.

Additionally, a Natural-Language Processor (NLP) may be provided outputting the verbal action command to the logic circuitry.

Additionally, a Wide-Area-Network (WAN) transceiver may be provided for receiving transmissions over the talkgroup and outputting the talkgroup identification to the logic circuitry.

Finally, a database may be provided comprising the mapping of the talkgroup to the IoT device address.

Figure 6:
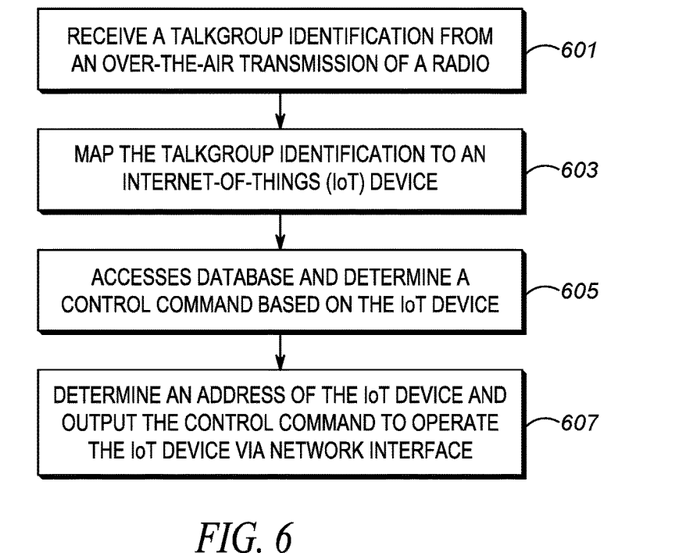
FIG. 6 is a flow chart showing operation of the PTT to IoT server of FIG. 5.

FIG. 6 is a flow chart showing operation of the PTT-to-IoT server of FIG. 5. The logic flow begins at step 601 where logic circuitry 503 receives a talkgroup identification from an over-the-air transmission of a radio. At step 603, logic circuitry 503 maps the talkgroup identification to an Internet-of-Things (IoT) device. The mapping is preferably done by accessing database 504 and retrieving the mappings as shown in Table 1 and Table 2. At step 605, logic circuitry 503 accesses database 504 and determines a control command based on the IoT device. Logic circuitry 503 also determines an address of the IoT device and outputs the control command to operate the IoT device via network interface 505 (step 607).

As discussed above, a verbal action command may be received from the over-the-air transmission; and the step of determining the control command further comprises determining the control command based on both the IoT device and the verbal action command.

Finally, the talkgroup identification preferably is received from a push-to-talk transmission from the radio.

As discussed above, each IoT device may be mapped to a specific talkgroup, so that reception on a first talkgroup initiates an action to a first IoT device, and reception on a second talkgroup initiates an action on a second IoT device. This is illustrated in the logic flow of FIG. 7.

Figure 7:
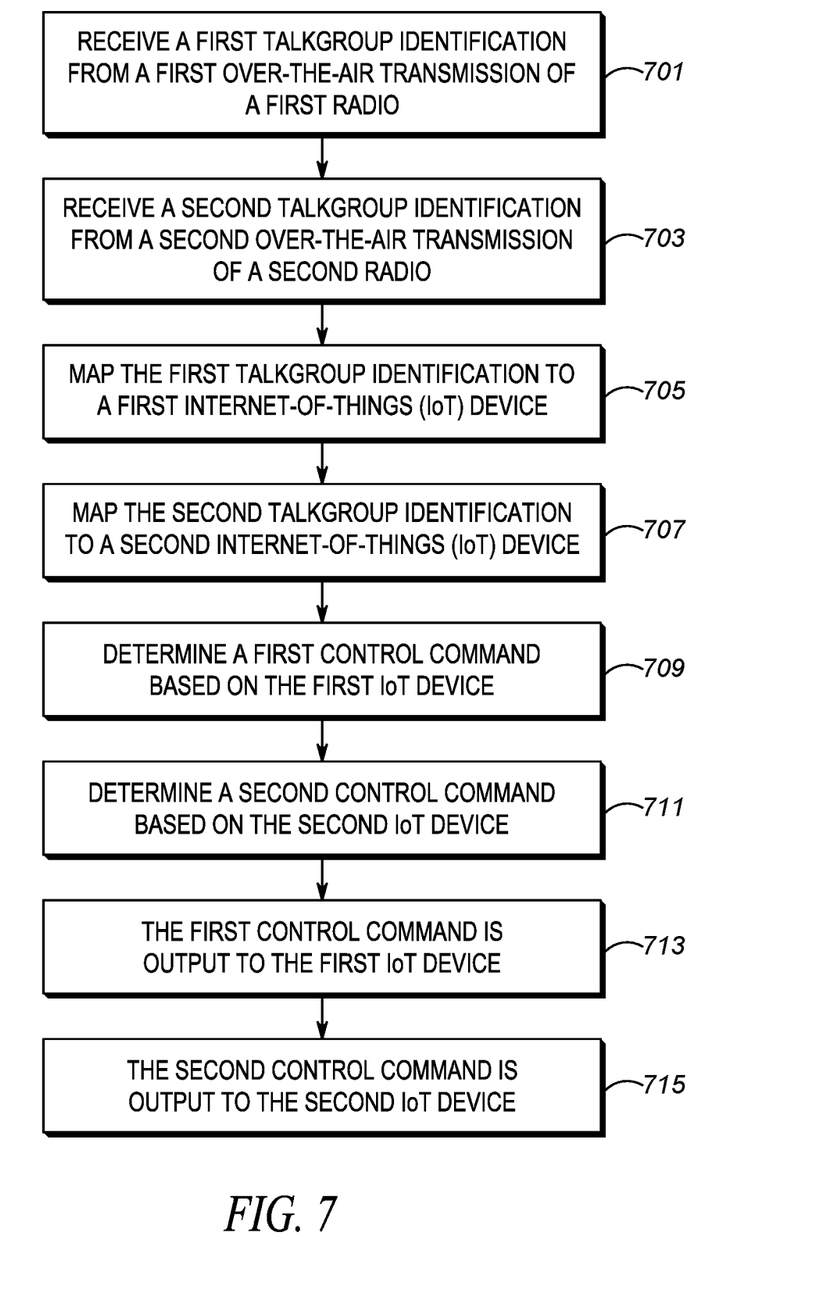
FIG. 7 is a flow chart showing operation of the PTT to IoT server of FIG. 5.

The logic flow begins at step 701 where logic circuitry 503 receives a first talkgroup identification from a first over-the-air transmission of a first radio. At step 703, logic circuitry 503 receives a second talkgroup identification from a second over-the-air transmission of a second radio. Logic circuitry 503 then maps the first talkgroup identification to a first Internet-of-Things (IoT) device (step 705) and maps the second talkgroup identification to a second IoT device (step 707). Logic circuitry then determines a first control command based on the first IoT device (step 709) and determines a second control command based on the second IoT device (step 711). The first control command is output to the first IoT device (step 713) and the second control command is output to the second IoT device (step 715).

As discussed above, the first control command may comprise a control command from a first control protocol, and the second control command may comprise a control command from a second control protocol, differing from the first control protocol, with the first IoT device differing from the second IoT device.

Logic circuitry 503 may also receive a first verbal action command from the first over-the-air transmission of the first radio and a second verbal action command from the second over-the-air transmission of the second radio. When this occurs, the step of determining the first control command further comprises determining the first control command based on both the first IoT device and the first verbal action command, and the step of determining the second control command further comprises determining the second control command based on both the second IoT device and the second verbal action command.

Common Users Talkgroup Creation

During operation of the above-described system, there may be different users that access an IoT device somewhat simultaneously (for example, within 30 seconds). For example, a police officer might PTT to a Door talkgroup and issue a voice command "Open Door" for a victim rescue purpose. At the same time, a firefighter might PTT the same Door TG and issue a voice command "Close Door" for fire ventilation purposes.

If no proper and immediate communication is established between the multiple users that trying to PTT to the same IOT talkgroup, there might be to-and-fro unnecessary actions. In order to address this issue, when multiple users attempt to access a same IoT device, server 301 will initiate creation of a talkgroup whose members are those individuals attempting to access the same IoT device. This allows communication among all individuals attempting to access the same IoT device.

As an example of the above, consider a police officer that presses PTT on their device to control a door to unlock. Within a predetermined time (e.g., 30 seconds), a Firefighter presses PTT on their device to control the door to lock. When detecting both the police officer and the Firefighter are attempting to control the common IoT device (i.e., the door) within the predetermined time, server 301 will message public-safety core network 404 instructing network 404 to create a talkgroup that will have the police officer and the firefighter as members. Alternatively, server 301 may message public-safety core network 404 instructing network 404 to add the police officer and the firefighter as members to an existing talkgroup.

In one embodiment, everyone who has been placed on the new talkgroup will be notified. There are several ways to notify officers of their placement on the new talkgroup. For example, a virtual partner (electronic virtual, or digital assistant) can help to notify and brief the police officer and the firefighter that they have been controlling the IoT device at almost a same time as another user, and that a common talkgroup has been created for them to communicate. In another example, a new talkgroup user interface can be displayed on the communication device and the user may be notified with a tone alert or vibration. In yet another example, a reason for creating the new talkgroup (e.g. opposite action of close door and open door) can be displayed on the user interface of a touch screen.

Having the police officer and firefighter on a common talkgroup will enable immediate communication between the police and the firefighter. The police will then be able to communicate the victim rescue intent while the firefighter will communicate the fire ventilation intent. Both can then agree on a proper course of action. The temporary talkgroup can then be removed from the network (or the police officer and firefighter can be removed from a talkgroup) after the discussion has ended (for example, after a predetermined period of time (e.g., 5 minutes) after the last controlling of the IoT device).

When radio 100 transmits over any talkgroup, a particular identification (ID) of the radio is provided with the communication. The ID uniquely identifies the radio. The identification of the radio can be associated with its operator (e.g., Officer Bob currently operates radio 010010). This identification may be simply sub-audible data included with the transmission, or may comprise information received on a separate data channel. Therefore, when PTT-to-Things server 301 receives a communication over a particular talkgroup, it can also receive an ID of any radio sending the transmission.

The ID can be used to determine all individuals attempting to access a particular "thing" by determining the users accessing the a particular talkgroup that is the talkgroup mapped or associated to the particular "thing" or IoT. In other words, when a PTT to IoT user (i.e., a user operating radio 100) needs to interact with an IoT device, the user presses a PTT button to transmit over a particular talkgroup associated with the IoT device. Server 301 will receive communications from all users attempting to access all IoT devices over the various talkgroups assigned to the devices. When multiple users access a same IoT device, the identifications of those users (or the radio identification ID) may be determined from their transmissions. The PTT to IoT server 301 then causes a new talkgroup to be created (with all the common radios accessing a same IoT device to be in added into the new talkgroup), or alternatively, the common radios accessing a same IoT device to be added to an existing talkgroup. Thus, members of the talkgroup will comprise those individuals attempting to access a same IoT device.

As discussed above, all users assigned to the new talkgroup will be notified that they have been assigned to the new talkgroup, and in one embodiment, the reason why they have been assigned to the new talkgroup will be provided. As discussed above, the notification my take place via a virtual digital assistant notifying the user, or a message (e.g., a text message, or instant message) being sent to the users.

It should also be noted that when multiple users are attempting to access a same IoT device, they are both communicating on a talkgroup assigned to the IoT device. (Multiple talkgroups may be assigned to the same IoT device). This communication may be brief. For example, a police officer may turn a knob on his radio to the door TG and attempt to open the door. Immediately after, the police officer may return to the police talkgroup. Both the police officer and firefighter communicating with an IoT device on the first talkgroup simultaneously (or somewhat simultaneously) causes creation of a second talkgroup having the police officer and firefighter as members (remember, the second talkgroup may be newly created, or the police officer and firefighter may be added as members to an existing talkgroup).

As mentioned, multiple talkgroups (e.g. multiple talkgroups in different LMR frequency, said UHF freq, VHF freq, 800 MHz frequency) might be mapped or associated to the same IoT devices at the IoT server 301. When multiple users are attempting to access a same IoT device, the multiple users might be using different talkgroup frequencies (based on their radio operating frequency) that are all mapped to the same IoT device at the IoT server. In this scenario, when the multiple users are communicating with the same IoT device using different talkgroups (within certain time period), the multiple talkgroups can be bridged together at core network 404, or a new talkgroup can be created and the multiple talkgroups added to the new talkgroup (for example bridge the different frequency talkgroups together through a repeater or gateway within core network 404).

It should be noted that PTT to IoT server may create the new talkgroup by sending a request to core network 404 to perform a "dynamic regrouping". As known in the art, with the dynamic regrouping feature, server 301 can seamlessly cause users to be added to a group without any intervention from radio operators.

In an alternate embodiment of the present invention, the above talkgroup creation may take place in core network 404, without any intervention from server 301. When this occurs, core network 404 will comprise those components within server 301, and determine that multiple radios are communicating over a single "things" talkgroup. When this occurs, network 404 may create a new talkgroup and add members as described above.

In an alternate embodiment of the present invention, a new talkgroup will only be created if the multiple users of the IoT device are performing opposite actions on the IoT device. For example, if both a firefighter and a police officer are attempting to open a door, then no new talkgroup will be created. However, if the firefighter is attempting to close a door, while the police officer is attempting to open the door, the talkgroup will be created. Thus, any talkgroup being created will be created with members attempting to perform opposite actions on an IoT device (e.g., open/close, lock/unlock, off/on, . . . , etc.). The list of "opposite actions" may be located in database 504, so that logic circuitry 503 can access database 504 and determine whether or not a talkgroup should be created.

With the above in mind, server 301 comprises logic circuitry configured to receive a first Push-to-talk (PTT) talkgroup identification and map the first PTT talkgroup identification to an Internet-of-Things (IoT) device having a particular address. The logic circuitry is also configured to determine a control command based on the IoT device, receive an identification of a radio attempting to operate the IoT device, determine that more-than-one radios are attempting to operate the IoT device, and cause the more-than-one radios to be added to a second PTT talkgroup. A network interface coupled to the logic circuitry is provided, the network interface is configured to output the control command to the particular address in order to operate the IoT device.

As discussed, the talkgroup may comprise a newly-created talkgroup. Additionally, a Wide-Area-Network (WAN) transceiver is provided for receiving transmissions over the PTT talkgroup and the identification of the radio, and outputting the PTT talkgroup and the identification to the logic circuitry.

Figure 8:
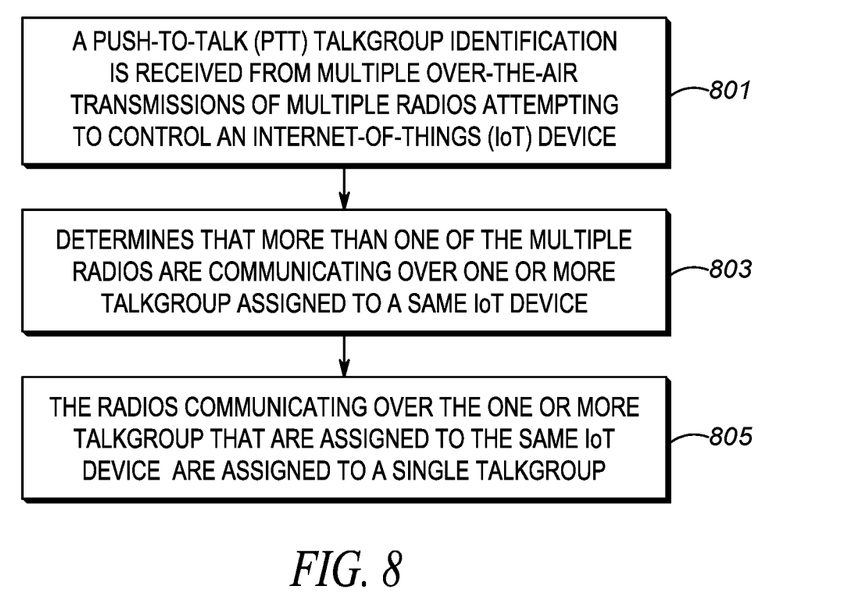
FIG. 8 is a flow chart showing adding users to a talkgroup.

The logic flow illustrated in FIG. 8 shows those steps (not all necessary) for talkgroup creation as described above. As described, the steps shown in FIG. 8 may take place in server 301, or core network 404. The logic flow begins at step 801 where a Push-to-Talk (PTT) talkgroup identification is received from multiple over-the-air transmissions of multiple radios attempting to control an Internet-of-Things (IoT) device. The talkgroup identification is preferably received via a wide-area-network transceiver.

At step 803, logic circuitry determines that more than one of the multiple radios are communicating over one or more talkgroups assigned to a same IoT device (for example, within a predetermined time period). As discussed above, radio identification information is transmitted by each radio with each transmission over a talkgroup. With this in mind, logic circuitry may determine that multiple radio identifications are being received, and communicating on one or more talkgroup that is assigned to the same IoT device.

At step 805 the radios communicating over the talkgroup(s) assigned to the same IoT device are assigned to a single talkgroup. As discussed, the single talkgroup may be newly created, or alternatively, the radios communicating over the talkgroup assigned to the same IoT device may be added to an existing talkgroup. When server 301 is performing this task, sever 301 communicates with core network 404 and causes core network 404 to perform a dynamic regrouping. However, when core network 404 is performing this task, it simply dynamically regroups as described above.

As described above, the step of adding the radios to the single talkgroup may comprise the step of creating the single talkgroup and adding the radios to the newly-created talkgroup.

Additionally, when the above steps are being performed in server 301, the server will also map the PTT talkgroup identification to an Internet-of-Things (IoT) device having a particular address, determine a control command based on the IoT device, and output the control command to the particular address to operate the IoT device.

Finally, the PTT talkgroup identification may be received from a push-to-talk transmission from the radio.

Figure 9:
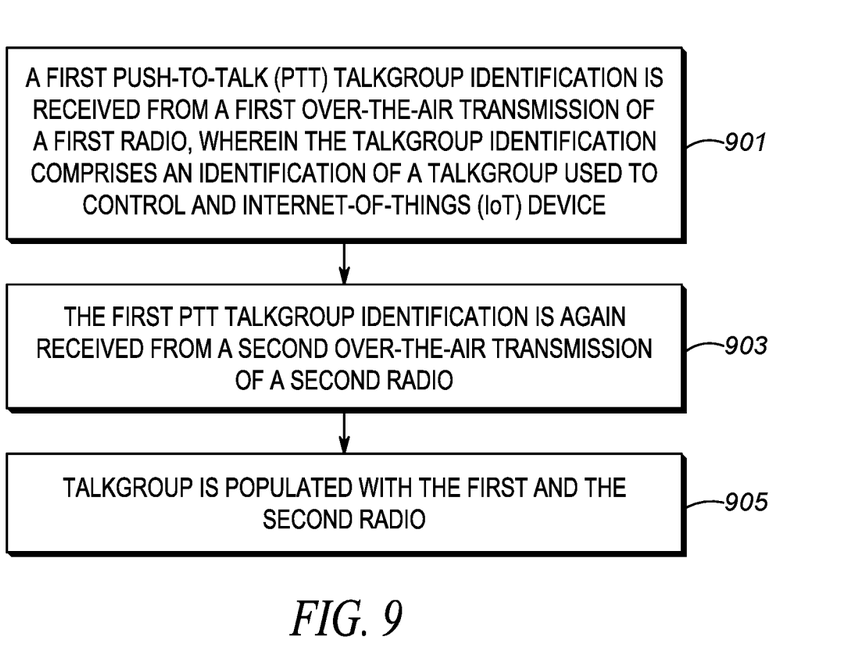
FIG. 9 is a flow chart showing adding users to a talkgroup.

FIG. 9 is a flow chart showing the steps (not all necessary) for adding two users to a single talkgroup. The logic flow begins at step 901 where a first Push-to-Talk (PTT) talkgroup identification is received from a first over-the-air transmission of a first radio, wherein the talkgroup identification comprises an identification of a talkgroup used to control an Internet-of-Things (IoT) device.

At step 903, the first PTT talkgroup identification is again received from a second over-the-air transmission of a second radio. This causes a talkgroup to be populated with the first and the second radio (step 905). As discussed the talkgroup is populated only when the talkgroup identification received from the first and the second radio are identical.

As discussed, the talkgroup can comprise a newly-created talkgroup.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. An apparatus comprising:
logic circuitry configured to receive a first Push-to-talk (PTT) talkgroup identification and map the first PTT talkgroup identification to an Internet-of-Things (IoT) device having a particular address, the logic circuitry also configured to determine a control command based on the IoT device, receive an identification of a radio attempting to operate the IoT device, determine that more-than-one radios are attempting to operate the IoT device, and cause the more-than-one radios to be added to a second PTT talkgroup; and a network interface coupled to the logic circuitry, the network interface configured to output the control command to the particular address in order to operate the IoT device.

2. The apparatus of claim 1 wherein the second PTT talkgroup comprises a newly-created talkgroup.

3. The apparatus of claim 1 wherein the logic circuitry also receives a verbal action command and determines the control command based on both the IoT device and the verbal action command.

4. The apparatus of claim 3 further comprising a Natural-Language Processor (NLP) outputting the verbal action command to the logic circuitry.

5. The apparatus of claim 1 wherein the logic circuitry determines that the multiple users of the IoT device are performing opposite actions on the IoT device, and only cause the more-than-one radios to be added to a second PTT talkgroup when the users are performing opposite actions on the IoT device.

6. The apparatus of claim 1 further comprising:
a Wide-Area-Network (WAN) transceiver receiving transmissions over the first PTT talkgroup and the identification of the radio, and outputting the first PTT talkgroup and the radio identification to the logic circuitry.

7. The apparatus of claim 1 further comprising a database comprising the mapping of the first PTT talkgroup to the IoT device.

8. The apparatus of claim 1 wherein the first PTT talkgroup identification was received from an over-the-air, push-to-talk communication.

9. A method comprising the steps of:
receiving a first Push-to-Talk (PTT) talkgroup identification from multiple over-the-air transmissions of multiple radios attempting to control an Internet-of-Things (IoT) device;
determining that more than one of the multiple radios are communicating over one or more talkgroups assigned to a same IoT device; and
adding the radios communicating over the one or more talkgroups assigned to the same IoT device to a single second PTT talkgroup.

10. The method of claim 9 wherein the step of adding the radios to the single second talkgroup comprises the step of creating the single second talkgroup and adding the radios to the newly-created second talkgroup.

11. The method of claim 9 further comprising the steps of:
mapping the first PTT talkgroup identification to an Internet-of-Things (IoT) device having a particular address;
determining a control command based on the IoT device; and
outputting the control command to the particular address to operate the IoT device.

12. The method of claim 9 wherein the PTT talkgroup identification was received from a push-to-talk transmission from the radio.

13. A method comprising the steps of:
receiving a first Push-to-Talk (PTT) talkgroup identification from a first over-the-air transmission of a first radio, wherein the talkgroup identification comprises an identification of a first talkgroup used to control an Internet-of-Things (IoT) device;
receiving the first PTT talkgroup identification from a second over-the-air transmission of a second radio; and
causing a second talkgroup to be populated with the first and the second radio only when the talkgroup identification received from the first and the second radio are identical.

14. The method of claim 13 wherein the second talkgroup comprises a newly-created talkgroup.

15. The method of claim 13 further comprising the steps of:
mapping the first PTT talkgroup identification to a first Internet-of-Things (IoT) device having a first address;
determining a control command based on the first IoT device; and
outputting the control command to the first IoT device at the first address.

* * * * *